US012147194B2

(12) United States Patent
Rochat

(10) Patent No.: US 12,147,194 B2
(45) Date of Patent: Nov. 19, 2024

(54) HOROLOGICAL MECHANISM FOR DISPLAYING AT LEAST THE SINGLE TIME INDICATION AND TIMEPIECE COMPRISING SUCH A MECHANISM

(71) Applicant: Montres Breguet S.A., L'Abbaye (CH)

(72) Inventor: Fabrice Rochat, Vallorbe (CH)

(73) Assignee: Montres Breguet S.A., L'Abbaye (CH)

( * ) Notice: Subject to any disclaimer, the term of this patent is extended or adjusted under 35 U.S.C. 154(b) by 404 days.

(21) Appl. No.: 17/646,900

(22) Filed: Jan. 4, 2022

(65) Prior Publication Data

US 2022/0342369 A1 Oct. 27, 2022

(30) Foreign Application Priority Data

Apr. 23, 2021 (EP) .................................... 21170065

(51) Int. Cl.
*G04B 1/16* (2006.01)
*G04B 15/14* (2006.01)
*G04B 19/02* (2006.01)

(52) U.S. Cl.
CPC ............... *G04B 1/16* (2013.01); *G04B 15/14* (2013.01); *G04B 19/02* (2013.01)

(58) Field of Classification Search
CPC ........... G04B 1/16; G04B 15/14; G04B 19/02
See application file for complete search history.

(56) References Cited

U.S. PATENT DOCUMENTS 9,471,036 B2 * 10/2016 Kaelin .................. G04B 1/145

FOREIGN PATENT DOCUMENTS

| | | |
|---|---|---|
| CH | 27 549 A | 1/1904 |
| CH | 1 792 770 A4 | 6/1972 |
| EP | 3 168 693 B1 | 11/2018 |

OTHER PUBLICATIONS

European Search Report issued Oct. 1, 2021 in European Application 21170065.3, filed on Apr. 23, 2021, 3 pages (with English Translation of Categories of cited documents).

* cited by examiner

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological mechanism including a barrel drum mounted pivotally free around a barrel shaft, a barrel spring being housed inside the barrel drum, this barrel spring including a first external coil wherein it is attached to the barrel drum, and a last internal coil, the barrel spring being attached to the barrel shaft, the winding of the barrel spring being done by a winding rod which meshes with the barrel drum, a barrel ratchet being fixedly mounted on the barrel shaft, the horological mechanism also including a finishing geartrain which includes a first finishing wheel with which the barrel ratchet meshes and which transmits a driving force from the barrel drum to an escapement mobile the purpose of which is to maintain the oscillations of a regulating member which, by its oscillations, regulates the rate of the horological mechanism.

5 Claims, 5 Drawing Sheets

HOROLOGICAL MECHANISM FOR DISPLAYING AT LEAST THE SINGLE TIME INDICATION AND TIMEPIECE COMPRISING SUCH A MECHANISM

CROSS-REFERENCE TO RELATED APPLICATION

This application claims priority to European Patent Application No. 21170065.3 filed on Apr. 23, 2021, the entire disclosure of which is hereby incorporated herein by reference.

TECHNICAL FIELD OF THE INVENTION

The present invention relates to a horological mechanism for displaying at least the single time indication. The invention also relates to a timepiece comprising such a mechanism.

TECHNOLOGICAL BACKGROUND

In mechanical watchmaking, the set of wheels and pinions is called the finishing geartrain which, from the barrel, transmits the driving force to the escapement, the purpose of which is to maintain the oscillations of a regulating member, typically a balance, which, by its oscillations, regulates the rate of the horological movement. Among the various pinions and wheels that make up the finishing geartrain, there is the centre mobile with which the cannon-pinion, that is to say a pinion which makes one revolution in 1 hour and which controls the dial-train via which the rotation of the minute pinion is transmitted to the hour hand, is friction coupled.

The disadvantage of the mechanism briefly described above lies in the fact that driving the cannon-pinion involves a large number of pinions and wheels with the problems of clearance and eccentricity of the rotations of these toothed mobiles that this implies, problems which, of course, have a negative impact on the accuracy of the time display.

These problems with the accuracy of the time display are particularly troublesome in the case where it is desired to provide an indication of the time by means of a single hour hand. Indeed, in such a case, the slightest imprecision in the driving of this hour hand results in a single time display error which can reach several minutes.

SUMMARY OF THE INVENTION

The purpose of the present invention is to overcome the problems mentioned above as well as others still by proposing a horological mechanism allowing to provide at least the single time indication with increased precision.

To this end, the present invention relates to a horological mechanism comprising a barrel drum mounted pivotally free around a barrel shaft, a barrel spring being housed inside the barrel drum, this barrel spring comprising a first external coil by which it is attached to the barrel drum, and a last internal coil by which the barrel spring is attached to the barrel shaft, the winding of the barrel spring being done by a winding rod which meshes with the barrel drum via a winding geartrain, a barrel ratchet being fixedly mounted on the barrel shaft, the horological mechanism also comprising a finishing geartrain which includes a first finishing wheel with which the barrel ratchet meshes, and which transmits a driving force from the barrel drum to an escapement mobile the purpose of which is to maintain the oscillations of a regulating member which, by its oscillations, regulates the rate of the horological movement, the horological mechanism also comprising an hour wheel frictionally mounted on the barrel shaft and to which an hour hand is attached, the entire kinematic chain extending from the barrel ratchet to the escapement being calculated so that the barrel ratchet, and therefore the hour wheel, rotate at the rate of one complete revolution in 12 or 24 hours.

Thanks to these features, the present invention provides a horological mechanism comprising a barrel drum on the barrel shaft of which an hour wheel is mounted. In that respect, the present invention differs from the usual embodiments wherein the cannon-pinion is for example attached to an axis of a centre wheel of the finishing geartrain and is connected to the hour wheel via one or more mobiles. As the present invention teaches mounting the hour wheel directly on the barrel shaft, the connection between the hour wheel and the escapement is as direct as possible. This allows to avoid as much as possible the problems of clearance and eccentricity of the toothed mobiles that are usually encountered in the transmission of movement between the cannon-pinion and the hour wheel, and therefore to guarantee an accurate display of the time. To achieve this result, two measures must be taken: on the one hand, the entire kinematic chain extending from the barrel ratchet to the escapement is calculated so that the barrel ratchet, and therefore the hour wheel, rotate at the rate of one complete revolution in 12 or 24 hours; on the other hand, so that it is possible to mount the hour wheel on the barrel shaft, the winding of the barrel spring is done by a winding rod which does not mesh with the barrel ratchet which is fixedly mounted on the barrel shaft, but meshes with the barrel drum, and the barrel ratchet meshes with the first wheel of the finishing geartrain. Another advantage of the invention can be seen in the fact that by dispensing with one or more reduction mobiles between the cannon-pinion and the hour wheel, space is saved. Likewise, by providing to attach the hour wheel to the barrel shaft, the barrel drum can be arranged in the centre of the movement, so that it can be larger than in the case where it is to be disposed next to the hand and therefore a barrel drum of smaller diameter is sufficient. Consequently, thanks to the invention, a horological mechanism with a greater power reserve is provided.

According to a special embodiment of the invention, a minute wheel is attached to an axis of a wheel of the finishing geartrain which is calculated so that this wheel makes one complete revolution in 60 minutes.

The invention also relates to a timepiece, in particular a wristwatch, comprising such a horological mechanism.

BRIEF DESCRIPTION OF THE FIGURES

Other features and advantages of the present invention will emerge more clearly from the following detailed description of an embodiment of the horological mechanism according to the invention, this example being given in a purely illustrative and non-limiting manner only in connection with the appended drawing on which.

DETAILED DESCRIPTION OF THE INVENTION

The present invention proceeds from the inventive general idea of displaying the single time by means of an hour wheel attached to a shaft of a barrel drum. By proceeding in this way, it is possible to dispense with mobile(s) which are usually used in horological mechanisms to ensure reduction between the cannon-pinion and the hour wheel and thus avoids the problems of clearance and eccentricity inherent in these mobiles which are a source of inaccuracy in the display of the time. To achieve this result, the present invention teaches that the winding of the barrel spring is done by means of a winding rod which is not engaged with the barrel ratchet as is usually the case, but with the barrel drum itself, while the barrel ratchet meshes with the first wheel of the finishing geartrain. By means of an appropriate calculation of the number of teeth and the diameter of the various geartrains that make up the kinematic chain extending from the barrel ratchet to the escapement via the finishing geartrain, it is possible to rotate the barrel ratchet and therefore the hour wheel at the rate of one complete revolution in 12 or 24 hours. According to a special embodiment of the invention, a minute wheel is mounted on an axis of a wheel of the finishing geartrain arranged so that this wheel rotates one complete revolution in 60 minutes.

Figure 1:
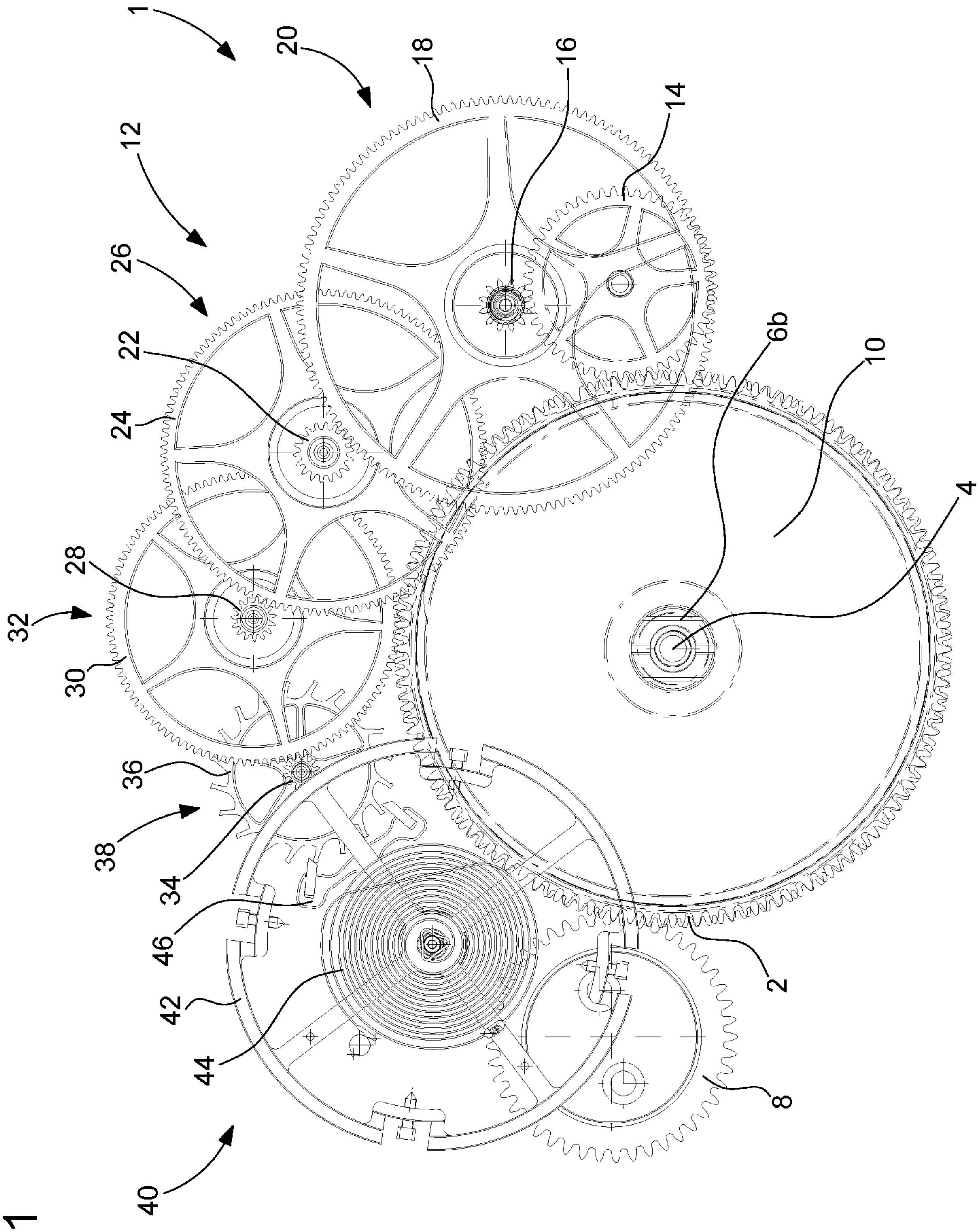
FIG. 1 is a top view of the part of a horological movement between a barrel drum and a regulating member which are connected to each other by means of a finishing geartrain and an escapement.
Figure 2:
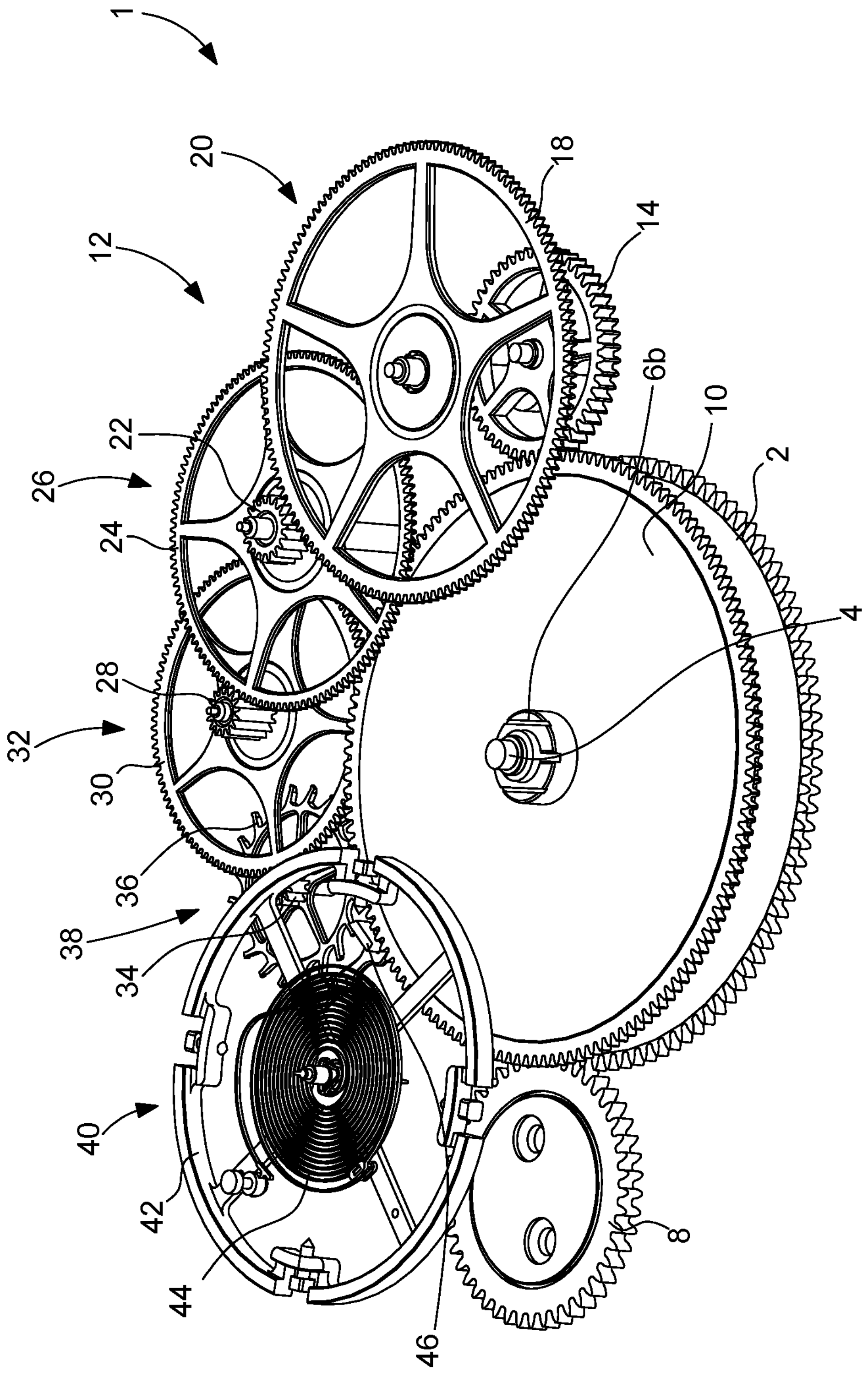
FIG. 2 is a perspective view of the part of the horological movement shown in FIG. 1.
Figure 4:
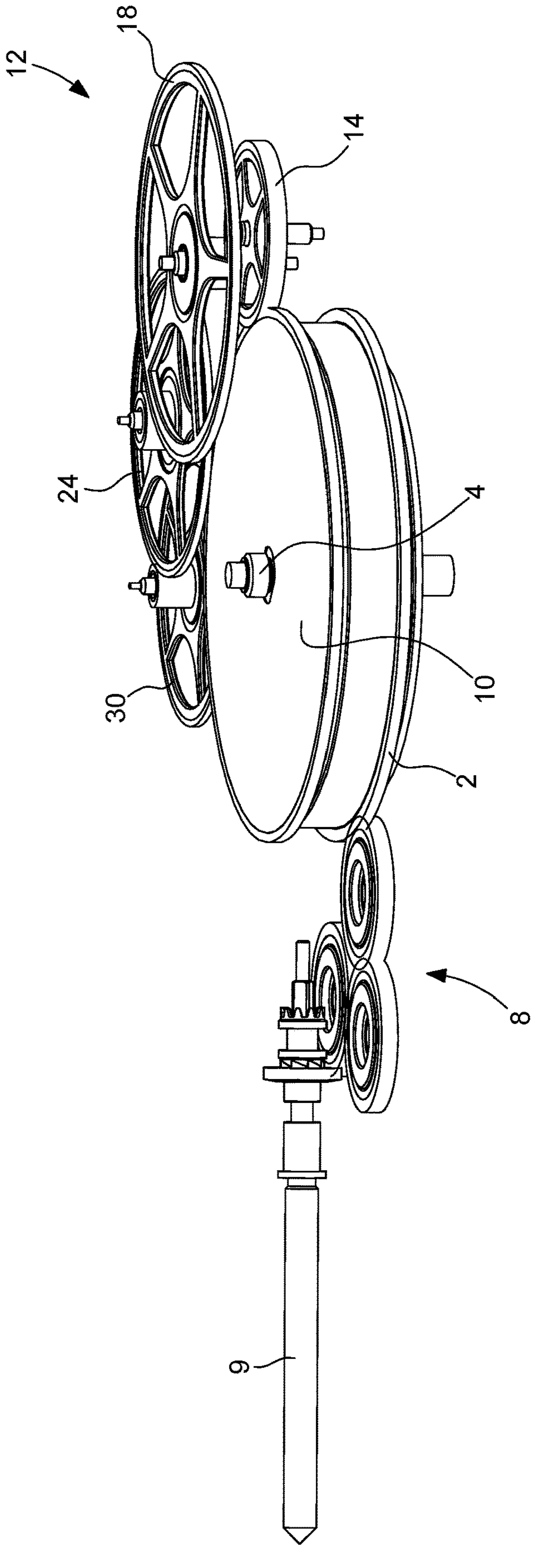
FIG. 4 is a perspective view of the horological mechanism shown in FIG. 3.

FIGS. 1 and 2 are respectively top and perspective views of the part of a horological movement into which the horological mechanism according to the invention is integrated. Designated as a whole by the general reference numeral 1, this horological movement comprises at its centre a barrel drum 2 mounted pivotally free around a barrel shaft 4. A barrel spring 6, housed inside the barrel drum 2, conventionally comprises a first external coil 6*a* by which it is attached to the barrel drum 2, and a last internal coil 6*b* by which the barrel spring 6 is attached to the barrel shaft 4. According to the invention, the winding of the barrel spring 6 is done by a winding geartrain 8 which is actuated by a winding rod 9 (see FIG. 4) and which does not mesh, as is usually the case, with a barrel ratchet 10 fixedly mounted on the barrel shaft 4, but meshes with the barrel drum 2 itself.

According to another feature of the invention, the horological mechanism also comprises a finishing geartrain 12 which includes a first finishing wheel 14 with which the barrel ratchet 10 meshes. This first finishing wheel 14 meshes with a centre-pinion 16 which, with a centre-wheel 18, forms a centre-mobile 20. In turn, the centre-wheel 18 meshes with a third pinion 22 which, with a third wheel 24, forms a third mobile 26. In turn, the third wheel 24 meshes with a second pinion 28 which, with a second wheel 30, forms a second mobile 32. Finally, the second wheel 30 meshes with an escapement pinion 34 which, with an escapement wheel 36, forms an escapement mobile 38. Thanks to the driving force that it receives from the barrel drum 2, the escapement mobile 38 is able to maintain the oscillations of a regulating member 40 which, by its oscillations, regulates the rate of the horological movement 1. According to an exemplary embodiment given for purely illustrative purposes only, this regulating member 40 is made up of an assembly formed by a balance 42 and a spiral spring 44 and cooperates with the escapement wheel 36 via an anchor 46.

Figure 3:
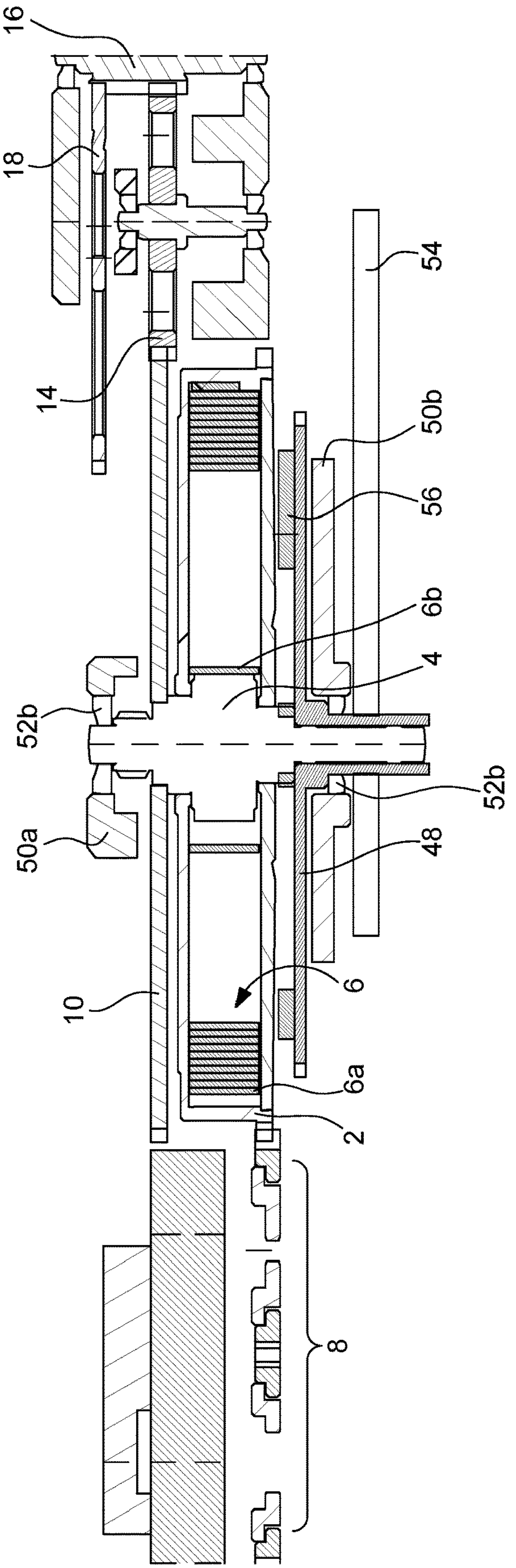
FIG. 3 is a sectional view in elevation of the horological mechanism according to the invention.

According to another feature of the invention, an hour wheel 48 is elastically coupled with the barrel shaft 4 in a manner which will be described in more detail below. As can be seen upon examining FIG. 3, the assembly formed by the barrel shaft 4 and the hour wheel 48 is pivoted between a first bridge 50*a* and a second bridge 50*b* by means of stones 52*a*, 52*b* which act as bearings. According to yet another feature of the invention, the number of teeth and the diameters of the geartrains which make up the whole kinematic chain extending from the barrel ratchet 10 to the escapement mobile 38 are calculated so that the hour wheel 48 to which an hour hand 54 is attached for displaying the single time rotates at the rate of one complete revolution in 12 or 24 hours.

The horological mechanism according to the invention described above operates as follows. To wind the barrel spring 6, the winding rod 9 is actuated which, as recalled, meshes via a winding geartrain 8 with the barrel drum 2. Under the effect of the actuation of the winding rod 9, the barrel drum 2 rotates and drives the first external coil 6*a* of the barrel spring 6 by which the latter is attached to the barrel drum 2. At the same time, the last internal coil 6*b* by which the barrel spring 6 is attached to the barrel shaft 4 remains attached, so that the barrel spring 6 tightens. Then, during operation, the barrel spring 6 begins to relax. As the barrel drum 2 is then stationary, the barrel spring 6 pivots the barrel shaft 4, and therefore the barrel ratchet 10, by its last internal coil 6*b*. The driving force produced by the barrel spring 6 which relaxes will thus be communicated via the barrel ratchet 10 and the assembly of the finishing geartrain 12 to the escapement mobile 38, the purpose of which is to maintain the oscillations of the balance 42, which, by its oscillations, regulates the rate of the horological movement 1. It is recalled that the number of teeth and the diameters of the geartrains that make up the entire kinematic chain extending from the barrel ratchet 10 to the escapement mobile 38 are calculated so that the hour wheel 48 to which an hour hand 54 is attached for displaying the single time rotates at the rate of one complete revolution in 12 or 24 hours.

Figure 5:
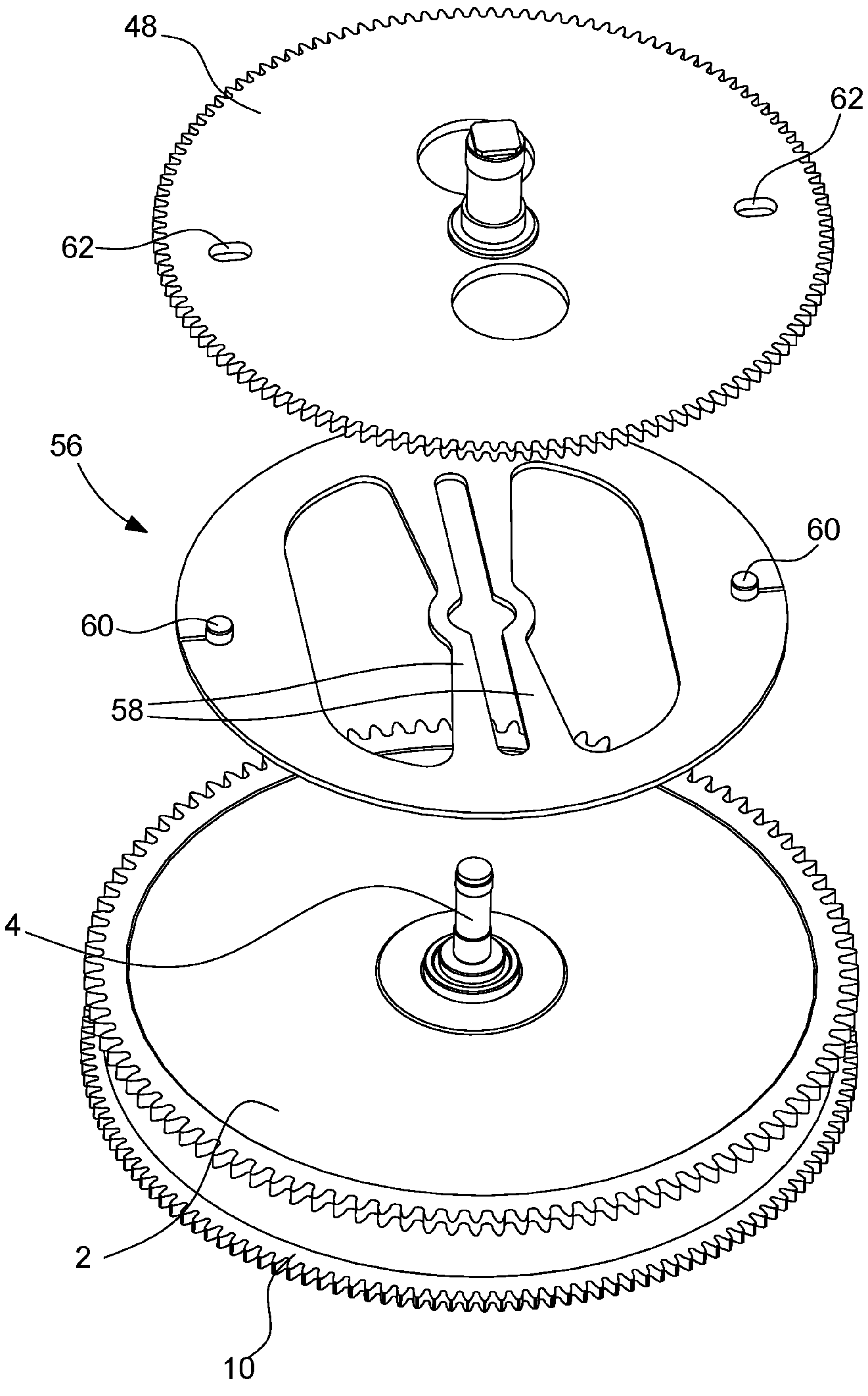
FIG. 5 illustrates the friction coupling between the hour wheel and the barrel shaft.

As indicated above, the hour wheel 48 is frictionally coupled with the barrel shaft 4, in order to allow adjustment of the single time display. To this end, the hour wheel 48 is coupled with the barrel shaft 4 by means of a friction wheel 56 disposed between the barrel drum 2 and this hour wheel 48. As can be seen from FIG. 5 appended to the present patent application, the friction wheel 56 is provided with two flexible arms 58 which grip the barrel shaft 4, so that this friction wheel 56 is elastically coupled with the barrel shaft 4 and is rotated by the latter. The hour wheel 48 is then placed on the friction wheel 56 so that two lugs 60 which stand on the surface of the friction wheel 56 engage in two corresponding openings 62 made in the hour wheel 48, which guarantees the rotational coupling of the hour wheel 48 with the friction wheel 56.

It goes without saying that the present invention is not limited to the embodiment which has just been described and that various modifications and simple variants can be considered by the person skilled in the art without departing from the scope of the invention as defined by the appended claims. In particular, according to a special embodiment of the invention, a minute wheel is attached to an axis of a wheel of the finishing geartrain 12 which is calculated so that this wheel makes one complete revolution in 60 minutes. The invention also relates to a timepiece such as a wristwatch comprising such a horological mechanism. The horological mechanism according to the invention can advantageously be arranged so that the barrel drum 2 is located at the centre of the watch case, so that the hour wheel 48 to which the hour hand 54 is attached for displaying the single time is located at the centre of the dial of this watch.

NOMENCLATURE

1. Horological movement
2. Barrel drum
4. Barrel shaft
6. Barrel spring
6*a*. First external coil
6*b*. Last internal coil
8. Winding geartrain
9. Winding rod
10. Barrel ratchet
12. Finishing geartrain
14. First finishing wheel
16. Centre-pinion
18. Centre-wheel
20. Centre-mobile
22. Third pinion
24. Third wheel
26. Third mobile
28. Second pinion
30. Second wheel
32. Second mobile
34. Escapement pinion
36. Escapement wheel
38. Escapement mobile
40. Regulating member
42. Balance
44. Spiral spring
46. Anchor
48. Hour wheel
50*a*. First bridge
50*b*. Second bridge
52*a*, 52*b*. Stones
54. Hour hand
56. Friction wheel
58. Flexible arms
60. Lugs
62. Openings

The invention claimed is:

1. A horological mechanism comprising a barrel drum mounted pivotally free around a barrel shaft, a barrel spring being housed inside the barrel drum, said barrel spring comprising a first external coil wherein the barrel spring is attached to the barrel drum, and a last internal coil wherein the barrel spring is attached to the barrel shaft, the winding of the barrel spring being done by a winding rod which meshes with the barrel drum via a winding geartrain, a barrel ratchet being fixedly mounted on the barrel shaft, the horological mechanism also comprising a finishing geartrain which includes a first finishing wheel with which the barrel ratchet meshes, and which transmits a driving force from the barrel drum to an escapement mobile the purpose of which is to maintain the oscillations of a regulating member which, by its oscillations, regulates the rate of the horological mechanism, the horological mechanism also comprising an hour wheel frictionally mounted on the barrel shaft and to which an hour hand is attached for displaying a time, said hour wheel being frictionally coupled with the barrel shaft, a kinematic chain extending from the barrel ratchet to the escapement mobile being calculated so that the barrel ratchet, and therefore the hour wheel, rotate at the rate of one complete revolution in 12 or 24 hours.

2. The horological mechanism according to claim 1, wherein a minute wheel is attached to an axis of a wheel of the finishing geartrain which is calculated so that said wheel makes one complete revolution in 60 minutes.

3. The horological mechanism according to claim 2, wherein the hour wheel is coupled with the barrel shaft with a friction wheel disposed between the barrel drum and said hour wheel, the friction wheel being provided with two flexible arms which grip the barrel shaft, so that said friction wheel is elastically coupled with the barrel shaft and is rotated by the latter, the hour wheel being placed on the friction wheel so that two lugs which stand on the surface of the friction wheel engage in two corresponding openings made in the hour wheel, which guarantees the rotational coupling of the hour wheel with the friction wheel.

4. The horological mechanism according to claim 1, wherein the hour wheel is coupled with the barrel shaft with a friction wheel disposed between the barrel drum and said hour wheel, the friction wheel being provided with two flexible arms which grip the barrel shaft, so that said friction wheel is elastically coupled with the barrel shaft and is rotated by the latter, the hour wheel being placed on the friction wheel so that two lugs which stand on the surface of the friction wheel engage in two corresponding openings made in the hour wheel, which guarantees the rotational coupling of the hour wheel with the friction wheel.

5. A timepiece comprising a horological mechanism according to claim 1.

* * * * *